United States Patent
Sauer

(10) Patent No.: US 11,920,968 B2
(45) Date of Patent: Mar. 5, 2024

(54) DEVICE AND METHOD FOR AIR QUANTITY RECORDING

(71) Applicant: ebm-papst Mulfingen GmbH & Co. KG, Mulfingen (DE)

(72) Inventor: Thomas Sauer, Bad Mergentheim (DE)

(73) Assignee: ebm-papst Mulfingen GmbH & Co. KG, Mulfingen (DE)

( * ) Notice: Subject to any disclaimer, the term of this patent is extended or adjusted under 35 U.S.C. 154(b) by 66 days.

(21) Appl. No.: 16/976,926

(22) PCT Filed: Mar. 6, 2019

(86) PCT No.: PCT/EP2019/055598
§ 371 (c)(1),
(2) Date: Aug. 31, 2020

(87) PCT Pub. No.: WO2019/170765
PCT Pub. Date: Sep. 12, 2019

(65) Prior Publication Data
US 2021/0041281 A1  Feb. 11, 2021

(30) Foreign Application Priority Data
Mar. 6, 2018  (DE) .................... 10 2018 105 063.1

(51) Int. Cl.
*G01F 15/063* (2022.01)
*G01F 1/36* (2006.01)
(Continued)

(52) U.S. Cl.
CPC .............. *G01F 15/063* (2013.01); *G01F 1/36* (2013.01); *G06Q 30/0283* (2013.01);
(Continued)

(58) Field of Classification Search
CPC ........... H04Q 2209/00; H04Q 2209/10; H04Q 2209/30; H04Q 2209/40; H04Q 2209/60;
(Continued)

(56) References Cited

U.S. PATENT DOCUMENTS

| 4,308,992 A | * | 1/1982 | Horton | .................. F24F 3/0442 236/94 |
| 7,719,812 B2 | * | 5/2010 | Phadke | .................. H02M 1/32 361/93.1 |

(Continued)

FOREIGN PATENT DOCUMENTS

| CN | 2823883 Y | * | 4/2006 | ............. G01K 17/06 |
| CN | 101435712 A | | 5/2009 | |

(Continued)

OTHER PUBLICATIONS

International Search Report and Written Opinion of the International Searching Authority, issued in PCT/EP2019/055598, dated Jun. 3, 2019; ISA/EP.

(Continued)

*Primary Examiner* — Franklin D Balseca
(74) *Attorney, Agent, or Firm* — Harness, Dickey & Pierce, P.L.C.

(57) ABSTRACT

An apparatus and a method for ascertaining and billing for a volume of air generated by an air-conveying device. The air quantity ascertaining and billing apparatus has an air-conveying device generating an air volume flow through an air passage. A measuring device measures air-related parameters of the particular air volume flow. An analysis unit analyzes the measured parameters, in order to determine the total air volume that was conveyed by the air conveying device through the air passage over a period. A transfer device transfers the value determined for the air volume by the analysis unit to a validation device. The validation device links the air volume flow or the determined air (Continued)

volume to an economic value, in order to obtain a billing value for the generated air volume.

1 Claim, 2 Drawing Sheets

(51) Int. Cl.
  *G06Q 10/20*    (2023.01)
  *G06Q 30/0283*  (2023.01)
  *G06Q 30/04*   (2012.01)
  *G06Q 50/06*   (2012.01)

(52) U.S. Cl.
  CPC ............ *G06Q 30/04* (2013.01); *G06Q 50/06* (2013.01); *G06Q 10/20* (2013.01)

(58) Field of Classification Search
  CPC ........... H04Q 2209/70; H04Q 2209/80; H04Q 2209/84; H04Q 9/00; G01F 1/36; G01F 15/063; G06Q 10/20; G06Q 50/06; G06Q 30/0283; G06Q 30/04
  See application file for complete search history.

(56) References Cited

U.S. PATENT DOCUMENTS

| | | | |
|---|---|---|---|
| 8,645,239 B2 * | 2/2014 | Swaminathan | G08C 15/06 709/224 |
| 2014/0297210 A1 | 10/2014 | Kamel et al. | |
| 2015/0323394 A1 | 11/2015 | Alsaleem | |
| 2017/0011318 A1 * | 1/2017 | Vigano | G06Q 10/06313 |
| 2019/0152497 A1 * | 5/2019 | Murata | G01K 3/06 |

FOREIGN PATENT DOCUMENTS

| | | | | |
|---|---|---|---|---|
| CN | 101504562 A | 8/2009 | | |
| CN | 101726343 A | 6/2010 | | |
| CN | 102099823 A | 6/2011 | | |
| CN | 102200076 A | 9/2011 | | |
| CN | 102222348 A | 10/2011 | | |
| CN | 103542904 A | 1/2014 | | |
| CN | 104268388 A | 1/2015 | | |
| CN | 105352116 A | 2/2016 | | |
| CN | 106203400 A | 12/2016 | | |
| CN | 206352594 U | 7/2017 | | |
| CN | 109063567 A | 12/2018 | | |
| DE | 102005007914 A1 | 8/2006 | | |
| DE | 202010013811 U1 | 1/2011 | | |
| DE | 102015101407 A1 * | 10/2015 | ............. | G01K 17/08 |
| WO | WO-2006084656 A1 * | 8/2006 | ............. | G01K 17/06 |

OTHER PUBLICATIONS

Office Action from copending Chinese Appplication No. 201810732797.2 dated Jul. 9, 2021.

Chinese Office Action dated Dec. 3, 2020 in corresponding Chinese Application No. 201810732797.2.

* cited by examiner

DEVICE AND METHOD FOR AIR QUANTITY RECORDING

CROSS-REFERENCE TO RELATED APPLICATIONS

This application is a National Stage of International Application No. PCT/EP2019/055598, filed Mar. 6, 2019 and published in German as WO 2019/170765 on Sep. 12, 2019. This application claims priority to German Patent Application No. 10 2018 105 063.1, filed Mar. 6, 2018. The entire disclosures of the above applications are incorporated herein by reference.

FIELD

The present disclosure relates to a method and an air quantity recording and invoicing device.

SUMMARY

Fans are typically used to move air in ventilation systems and provide an air volume flow. It is common practice, in this case, for the facility operator to purchase the fans or air conveyor units required for this purpose and operate them on his own responsibility. Also helping to physically possess or purchase the devices for this purpose.

As a rule, however, these users do not necessarily need a fan as such, rather there is only a need for moving air. The prior art presently lacks devices to provide an air quantity to a user or a customer which is specified by this user, without the customer having to purchase technical components such as fans or air conveyor units for this purpose. For some users, it would therefore be advantageous if they could receive the air quantity required for their application. Thus, receive the moving air volume required for this purpose, as a type of service from a facility operator. A technical solution is therefore required where the quantity of the moved air can be recorded over a certain period of time and then brought to the user for invoicing.

It is therefore an object of the present disclosure to provide a technical device and a method, to provide an air quantity respectively required for a user, via a defined volume flow over a certain period of time. Also, it is able to invoice for the provided air quantity to the user.

This object is achieved by an air quantity recording and invoicing device comprising an air conveyor unit for generating an air volume flow through an air passage. A measuring unit measures ventilation parameters (p) of the respective air volume flow. An evaluation unit analyzes the measured parameters (p) to ascertain the total air volume that was conveyed over a period of time through the air passage by the air conveyor unit. A transmission unit transmits the value for the air volume ascertained by the evaluation unit to a validation unit. The validation unit links the air volume flow or the ascertained air volume to an economic value to obtain an invoicing value for the generated air volume.

According to the disclosure, an air quantity recording and invoicing device comprises an air delivery device for generating an air volume flow through an air passage. A measuring unit measures ventilation parameters of the respective air volume flow. An evaluation unit evaluates the measured parameters in order to ascertain the total air volume that was conveyed over a period of time T through the air passage by the air conveyor unit. A transmission unit transmits the value for the air volume ascertained by the evaluation unit to a validation unit. The validation unit assigns or links an economic value to the air volume flow or the ascertained air volume, in order to obtain an invoicing value for the generated air volume and to provide an invoice, if necessary.

For example, the parameters temperature or ambient humidity, that can then also be used indirectly for validation, are suitable as ventilation parameters.

In one preferred embodiment, the validation unit is designed such that a remaining service life can be calculated from the ascertained, in particular, total air volume and the corresponding measurement duration of the air conveyor unit. For this purpose, in particular characteristic values, characteristic curves, and experiential values can be stored in a database for each fan type. Thus for the respective fan in use, starting from the ascertained air volume and the total air volume that can be conveyed for this fan, the remaining service life in relation to the respective point in time, can be ascertained. This occurs specifically from the difference of the conveyed air volume flow and the average air volume flow that can be conveyed on average over the service life.

In a likewise advantageous embodiment, the validation unit can access customer data in a database of a computer center in order to assign an invoicing amount to the recorded air volume flow. This occurs in accordance with a customer-specific value stored in the database and creates an analog or digital invoice. Customer data in the meaning of the present disclosure are, so to speak, data of a certain user, customer, or buyer of an air volume in one or more facilities.

It is also advantageous if a transmitting unit transmits the ascertained invoicing value or an invoice, based on the invoicing value, to an external interface, for example, a customer interface, or an interface specially defined for this purpose. In this way, it is possible that at fixed invoicing periods, the respective air quantity consumed up to this period of time or the consumed air volume can be invoiced directly to the user.

In a further advantageous embodiment, the transmitting unit transmits the ascertained remaining service life to an external interface. In this way, it is not only possible to ascertain an air quantity already conveyed by the air conveyor unit, to validate its value, and to invoice it to the user via an invoicing function, but rather it is also possible to determine the remaining service life of the air conveyor unit. This establishes or predicts the point in time where the air conveyor unit is to be replaced or maintained.

In a further advantageous embodiment, the measuring unit records a pressure drop or in particular a differential pressure as a ventilation parameter, specifically at a measurement position, preferably at the air passage, to determine the air volume that is to be invoiced. Other digital or analog measuring units are also conceivable that are capable of recording such ventilation parameters of the volume flow, from which the conveyed air quantity may be ascertained.

It is also advantageous if the measuring unit records the ventilation parameter or parameters continuously or at least in discrete successive, in particular, fixed time intervals over a desired period of time. The measuring unit measures a specific selected ventilation parameter, for example, the pressure drop, at the air passage of the fan every minute. The conveyed air quantity or the consumed air volume is recorded from the successive measured data.

In a further advantageous embodiment, the evaluation unit has an arithmetic operator, preferably a digital integrator. It calculates a total volume flow by integration over a certain period of time T from the measured chronologically successive ventilation parameters. The time period is freely scalable and selectable in order to be able to coordinate and define invoicing periods.

A design is particularly advantageous where the evaluation unit has a microcontroller. It carries out the evaluation task using standardized controller processes.

In one advantageous embodiment the transmitting unit transmits the data wirelessly or by wire, via a network topology, preferably via a conventional network topology.

A further aspect of the present disclosure relates to a method for recording and invoicing a volume flow generated by an air conveyor unit. Preferably, this occurs using an air quantity recording and invoicing device as described above. This method comprises the following steps:
 a) generating an air volume flow through an air passage of an air conveyor unit;
 b) recording ventilation parameters of the air volume flow over a predefined period of time T at the air passage, by the measuring device;
 c) evaluating the measured parameters in order to ascertain the total air volume that was conveyed by the air conveyor unit through the air passage over the period of time T;
 d) transmitting the value for the air volume ascertained by the evaluation unit to a validation unit; and
 e) validating an economic value by the validation unit corresponding to the recorded air volume to calculate an invoicing value for the generated air volume.

In a likewise advantageous design of the method, in addition to recording and invoicing an air volume, the remaining service life of the air conveyor unit is also ascertained. The air volume ascertained in steps b) and c) by the evaluation unit is transmitted via an interface, which is external, to a receiving unit capable of receiving the data.

The above-disclosed features can be combined as desired, if this is technically feasible in the implementation of the disclosure and they are not technically contradictory, even if this combination of the features is not expressly disclosed.

DRAWINGS

The drawings described herein are for illustrative purposes only of selected embodiments and not all possible implementations, and are not intended to limit the scope of the present disclosure.

Other advantageous refinements of the invention are characterized in the dependent claims and will be described in greater detail in the following, in conjunction with the description of the preferred embodiment of the invention, with reference to the figures. In the figures:

Figure 1:
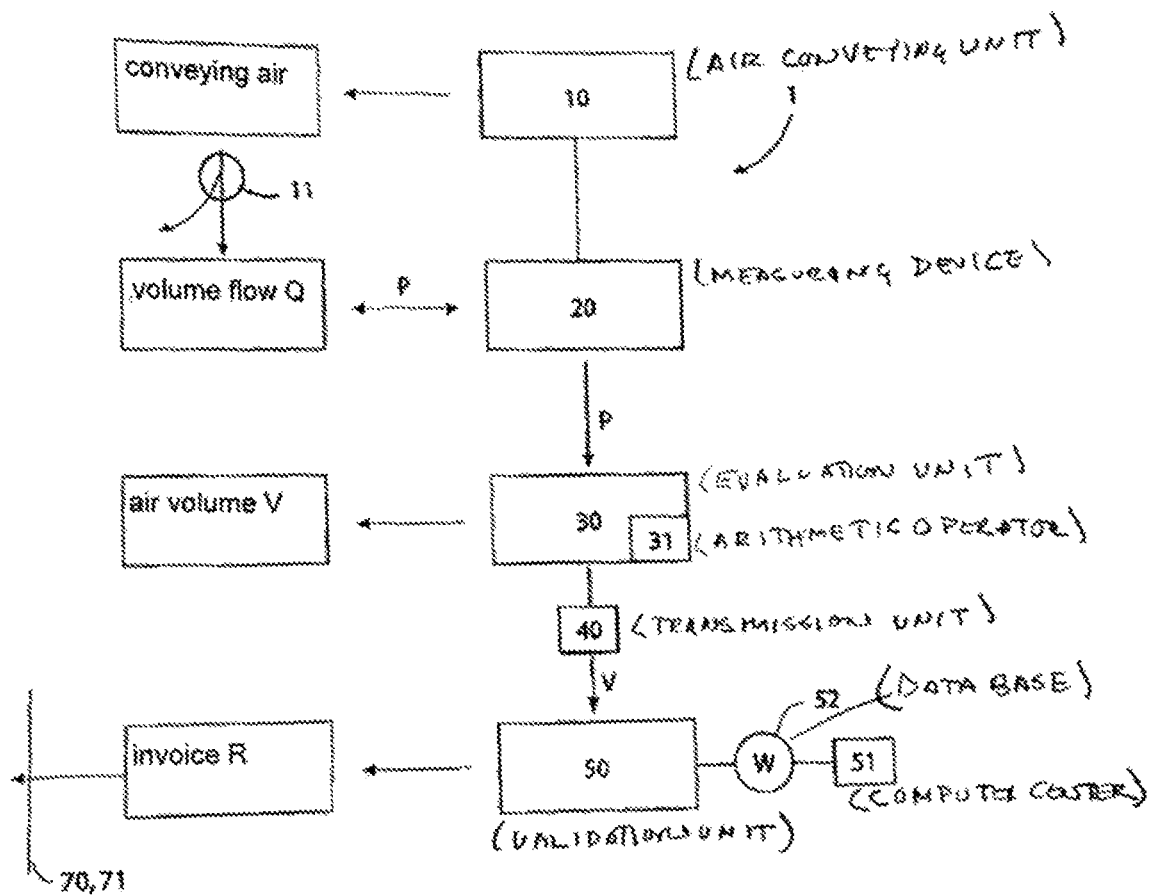
FIG. 1 is a schematic view of an exemplary embodiment.

The figures are solely schematic examples. The same reference signs in the figures denote the same functional and/or structural features. The disclosure is explained in greater detail below with reference to FIGS. 1 and 2 on the basis of exemplary embodiments.

DETAILED DESCRIPTION

Example embodiments will now be described more fully with reference to the accompanying drawings.

An air quantity recording and invoicing device 1, respectively, includes an air conveyor unit 10, a measuring unit 20, an evaluation unit 30, a transmission unit 40, and a validation unit 50.

The air conveyor unit 10 is, for example, a fan. It is used to generate a certain volume flow through the air passage 11, which is also shown. For simplification, this is to represent an application-related installation situation, where a certain air volume is provided to a user via a defined volume flow through the air passage 11.

The measuring device 20, which is only shown by way of example, measures at least one ventilation parameter P of the respective air volume flow Q, that passes through the air passage 11. The ventilation parameter P, selected for this purpose, in conjunction with the air volume flow Q, enables a direct calculation option of the air volume passing through the air passage 11 over a period of time T.

The evaluation unit 30 evaluates the measured parameters P in order to determine the total air volume that was conveyed by the air conveyor unit 10 through the air passage 11 over the period of time T.

The measurement of the pressure drop at an annular nozzle at the air passage 11 can be used to measure a ventilation parameter, for example. The pressure drop measured in this way can be converted into a volume flow using a correction factor.

The relationship between the static pressure and the differential pressure behavior can be used to ascertain the volume flow. The volume flow may be calculated from the differential pressure (differential pressure of the static pressures) according to the following equation:

$$Q = K * \sqrt{\Delta P w}$$

Here K represents a factor that takes into consideration the specific nozzle properties of the annular nozzle. ΔPw represents the differential pressure of the static pressures. Q determines the volume flow.

It is advantageous if the pressure decrease takes place, for example, at four points on the circumference of the inflow nozzle E. A customer connection can be produced via an installed T-hose connection 14. Such a hose connection 14 is, for example, suitable for the connection of pneumatic hoses to carry out the measurement using standardized technical equipment.

If, for example, the measured values of the volume flow Q are recorded and stored sufficiently frequently in a certain measuring cycle (for example, once per minute) and integrated via an integrator, the air quantity moved in a certain unit of time is obtained, for example, in cubic meters per hour. The air quantity moved in a month, for example, may thus be specifically determined. Then it may be invoiced to the user or buyer. To enable invoicing, the device according to the disclosure has a unit that enables the data to be sent to a computer center. Such a transmission unit 40 is shown by way of example in FIGS. 1 and 2. This transmission unit 40 is used to transmit the value ascertained by the evaluation unit 30, for the air volume, to a separate validation unit 50. The validation unit 50 links the ascertained air volume to an economic value W stored for the user or buyer. This enables it to obtain a specific invoicing value for the generated air volume.

Figure 2:
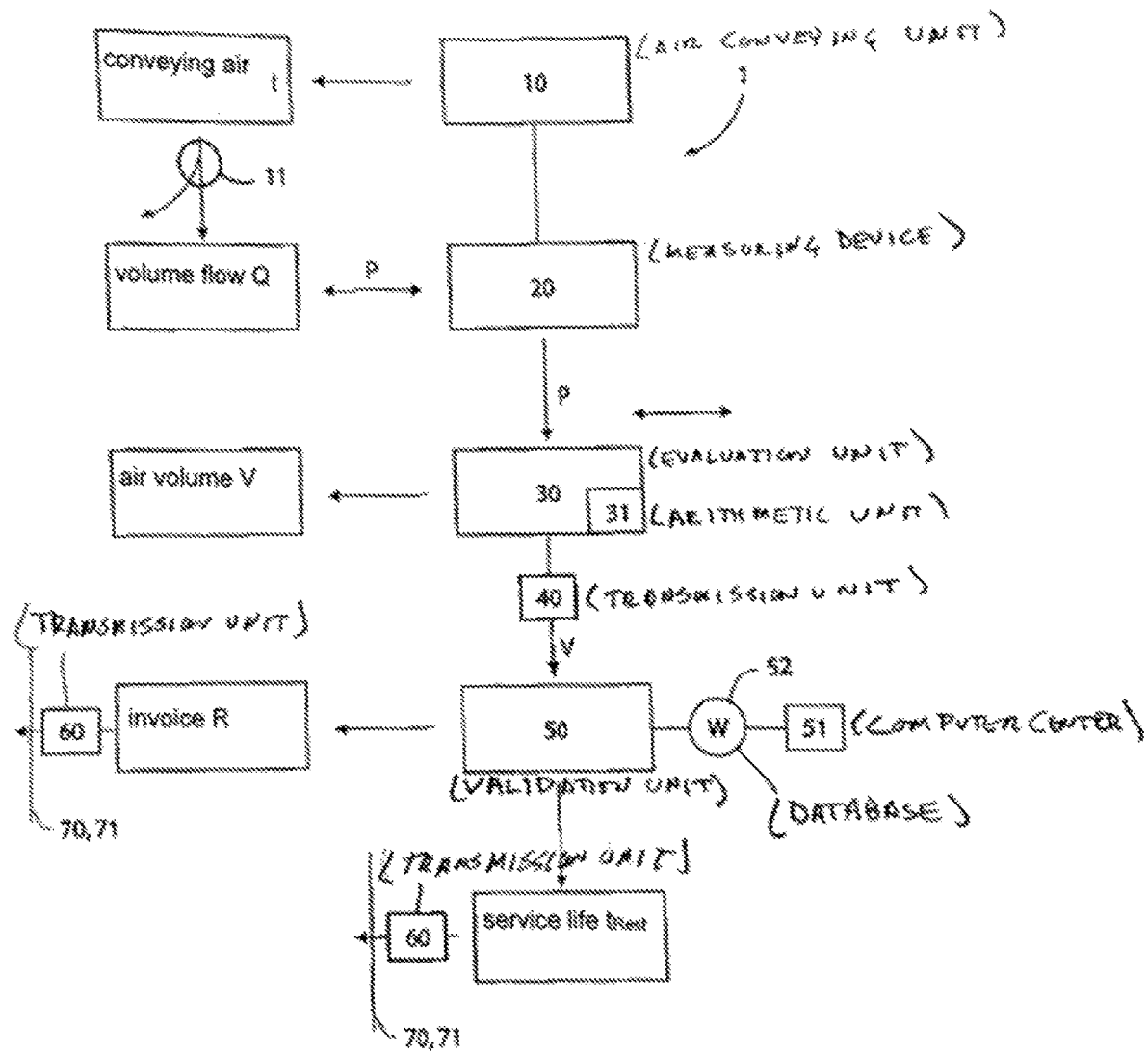
FIG. 2 is a schematic view of an alternative design of the exemplary embodiment from FIG. 1.

As is apparent in the embodiment of FIG. 2, the air quantity recording and invoicing device 1 is further designed such that the validation unit 50 can calculate a remaining service life $T_{rest}$. This is obtained rom the total ascertained air volume V and the corresponding measurement period of the air conveyor unit 10. The determination of a remaining selected service life can preferably be performed by a microcontroller.

The evaluation unit 30 can be designed such that a digitization with analog measured value and conversion of the volume flow (cubic meters per hour) into the moved air volume (cubic meters) is performed in the measuring unit by integration over a measurement period of time of the volume flow.

As is also apparent in FIGS. 1 and 2, the validation unit 50 is connected to a database 52 of a computer center 51. The validation unit 50 can access this data to assign an invoicing amount to the recorded air volume flow in accordance with a customer-specific value W stored in this database. Thus, an analog or digital invoice may be created without requiring further manual processing.

In other words, the creation of an invoice can be carried out per unit of time, for example, per month. An automatic transmission of the invoice, via the interface 70, 71 into a central management system or to a terminal can be carried out.

In the embodiment according to FIG. 2, information can be provided on an item of replacement or repair is also conducted to the interface 70, 71 to display that the fan will soon reach its remaining service life. Depending on procurement periods, suitable measures can be taken in a timely manner before reaching the predicted service life of the air conveyor unit. This prevents, or at least minimizes, an operational interruption of the facility.

As can be seen from the two embodiments according to FIG. 1 and FIG. 2, the evaluation unit 30 has a special arithmetic operator 31. Preferably, a digital integrator, designed to calculate a total air volume V by integration over the period of time T, from the measured chronologically successive ventilation parameters P. The evaluation unit 30 includes a microcontroller. However, the evaluation unit 30, the transmission unit 40, and the validation unit 50 can also be implemented using other technical means (not described in greater detail here).

The disclosure is thus not limited in its embodiment to the two above-described preferred exemplary embodiments. Rather, a number of variants are conceivable that make use of the described approach even with fundamentally different embodiments, for example, the integration of the function of a computer center into a processing unit of the air quantity recording and invoicing device. It can also be provided that the transmission unit 40 and the validation unit 50 are provided by a single combined unit having the corresponding technical functions.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

The invention claimed is:

1. A method for recording and invoicing an air volume using an air quantity recording and invoicing device including:
    an air conveyor unit for generating an air volume flow through an air passage;
    a measuring device to measure at least one ventilation parameter of the generated air volume flow flowing through the air passage;
    an evaluation unit analyzing the measured parameters to ascertain total air volume that was conveyed over a period of time through the air passage by the air conveyor unit;
    a transmitter enabling data for a value for the total air volume ascertained by the evaluation unit to be sent to a validation unit;
    the validation unit links the air volume flow or the ascertained total air volume to an economic value (W) to obtain an invoicing value for the generated air volume flow and the validation unit calculates a remaining service life of the air conveyor unit; and
    an external interface transmitting the calculated service life to a receiving unit;
    the method comprising:
    generating the air volume flow through the air passage by the air conveyor unit;
    recording the ventilation parameters of the air volume flow over the period of time at the air passage by the measuring unit;
    evaluating the measured parameters in order to determine the total air volume that was conveyed by the air conveyor unit through the air passage over the period of time;
    transmitting the value for the total air volume ascertained by the evaluation unit to the validation unit; and
    validating an economic value by the validation unit corresponding to the determined total air volume to calculate the invoicing value for the generated air volume flow;
    wherein in addition to the recording and invoicing of an air volume, the remaining service life is also ascertained by the validation unit from the ascertained total air volume and the recorded ventilation parameters, wherein the calculated remaining service life of the conveyor unit is transmitted via the external interface to the receiver unit.

* * * * *